(12) United States Patent
Abdul et al.

(10) Patent No.: US 7,996,594 B2
(45) Date of Patent: Aug. 9, 2011

(54) INTERRUPT-DRIVEN LINK STATUS FEEDBACK MECHANISM FOR EMBEDDED SWITCHES

(75) Inventors: Anis M. Abdul, Austin, TX (US); Nikhil Hegde, Round Rock, TX (US); Ajay Kumar Mahajan, Austin, TX (US); Rashmi Narasimhan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 12/412,502

(22) Filed: Mar. 27, 2009

(65) Prior Publication Data

US 2010/0250810 A1    Sep. 30, 2010

(51) Int. Cl.
*G06F 13/24* (2006.01)
*G06F 13/00* (2006.01)

(52) U.S. Cl. ............ 710/260; 710/306; 710/316; 714/2; 714/4; 714/48; 713/100; 709/223; 709/224; 370/216

(58) Field of Classification Search .................. 710/260; 714/2, 4, 48; 713/100; 709/223, 224; 370/216
See application file for complete search history.

(56) References Cited

U.S. PATENT DOCUMENTS

| | | | |
|---|---|---|---|
| 5,136,410 A | 8/1992 | Heiling et al. | |
| 6,359,709 B1 | 3/2002 | DeCusatis et al. | |
| 6,839,515 B1 | 1/2005 | Jahreis et al. | |
| 7,272,320 B2 | 9/2007 | DeCusatis et al. | |
| 7,418,525 B2 * | 8/2008 | Dalton et al. | 710/5 |
| 7,492,765 B2 * | 2/2009 | Edsall et al. | 370/389 |
| 7,549,018 B2 * | 6/2009 | Islam et al. | 711/114 |
| 7,577,134 B2 * | 8/2009 | Gopal Gowda et al. | 370/386 |
| 7,669,000 B2 * | 2/2010 | Sharma et al. | 710/310 |
| 7,724,642 B2 * | 5/2010 | Lum | 370/216 |
| 2006/0206602 A1 * | 9/2006 | Hunter et al. | 709/223 |
| 2007/0258463 A1 * | 11/2007 | Rhoades et al. | 370/395.52 |
| 2010/0250914 A1 * | 9/2010 | Abdul et al. | 713/100 |

* cited by examiner

*Primary Examiner* — Brian T Misiura
(74) *Attorney, Agent, or Firm* — Yee & Associates, P.C.; David A. Mims, Jr.

(57) ABSTRACT

A computer implemented method, a tangible computer readable medium, and a data processing system intelligently propagate link status information received by a blade server to the various ports of an embedded multi-port switch. The link status of a switch port in an external switch module can be communicated to the operating systems of individual blade servers that are affected by that link status. When an external switch module is unplugged from a server blade chassis, the bus controller broadcasts a link down event, such as a link down interrupt, to the individual server blades where it is received by the embedded multi-port switch for those server blades. The embedded multi-port switch translates the link down interrupt into a hardware link down event, and forwards the hardware link down event to the other elements connected to the embedded multi-port switch.

21 Claims, 6 Drawing Sheets

INTERRUPT-DRIVEN LINK STATUS FEEDBACK MECHANISM FOR EMBEDDED SWITCHES

BACKGROUND OF THE INVENTION

1. Field of the Invention

The present invention relates generally to a computer implemented method, a computer program product, and a data processing system. More specifically, the present invention relates to a computer implemented method, a computer program product, and a data processing system for intelligently propagating link status information received by a blade server to the various ports of an embedded multi-port switch.

2. Description of the Related Art

The use of server computers as devices within communications networks is well known in the art. A server is hardware that makes available file, database, printing, facsimile, communications or other services to client terminals/stations with access to the network the server serves. When the server permits client/terminal station access to an external communications network, it is sometimes known as a gateway. Servers are available in different sizes, shapes and varieties. Servers may be distributed throughout a network or they may be concentrated in centralized data centers.

Advances in centralized data processing centers have resulted in smaller form factors for server devices and an increase in the density of processing units, thereby reducing space requirements for computing infrastructure. One common form factor has been termed in the art a "blade server," comprising a device built for vertically inserting into a chassis that can house multiple devices that share power and other connections over a common backplane, i.e., a blade center. Slim, hot swappable blade servers, also referred to herein as "blades," fit in a single chassis like books on a bookshelf. Each blade server is an independent server, with its own processors, memory, storage, network controllers, operating system and applications. The blade server slides into a bay in the chassis and plugs into a mid- or backplane, sharing power, fans, floppy drives, switches, and ports with other blade servers. The benefits of the blade approach will be readily apparent to anyone tasked with running down hundreds of cables strung through racks just to add and remove servers. With switches and power units shared, precious space is freed up—and blade servers enable higher density with far greater ease. With a large number of high-performance server blades in a single chassis, blade technology achieves high levels of density.

A blade based rack uses a common bus for all the blades. This bus is used by the blades to communicate with the management module and also gives access to the external network via special external switch modules. Advanced versions of the server blades include an embedded blade switch. These embedded blade switches provide external connectivity to other units in the server blade, such as a Flexible Service Processor, available from International Business Machines, Corp.

In an advanced server blade having an embedded blade switch, the concept of a "link" differs from the traditional definition. When an external switch module is unplugged from the blade based rack, a bus controller generates a "link down" event to all the blades on the rack. However, because the operating systems on the individual server blades are not directly connected to the external switch module, an Ethernet device driver in an operating system will not receive the "link down" event from the bus controller.

Various mechanisms have been proposed to allow components on the individual server blades to find out about the link loss. However, the proposed mechanisms are based on polling the communications link, which leads to negative performance issues based on the inevitable polling delay. For example, if the operating system is using etherchannel across multiple Ethernet adapters, then etherchannel uses a feature which continuously pings an external reliable host—such as the gateway—to make decisions on failover. If this ping fails, the link is assumed to be lost, and a failover is initiated. However, this pinging method is prone to false link down events, since any loss of connectivity in the network will trigger an unnecessary Ethernet port failover.

BRIEF SUMMARY OF THE INVENTION

According to one embodiment of the present invention, a computer implemented method, a tangible computer readable medium, and a data processing system are provided for propagating link status information received by a blade server to the various ports of an embedded multi-port switch. The link status of a switch port in an external switch module can be communicated to the operating systems of individual blade servers that are affected by that link status. When an external switch module is unplugged from a server blade chassis, the bus controller broadcasts a link down event, such as a link down interrupt, to the individual server blades where it is received by the embedded multi-port switch for those server blades. The embedded multi-port switch translates the link down interrupt into a hardware link down event, and forwards the hardware link down event to the other elements connected to the embedded multi-port switch, such as for example, the operating system on the blade server and the service firmware on the blade server.

DETAILED DESCRIPTION OF THE INVENTION

Figure 1:
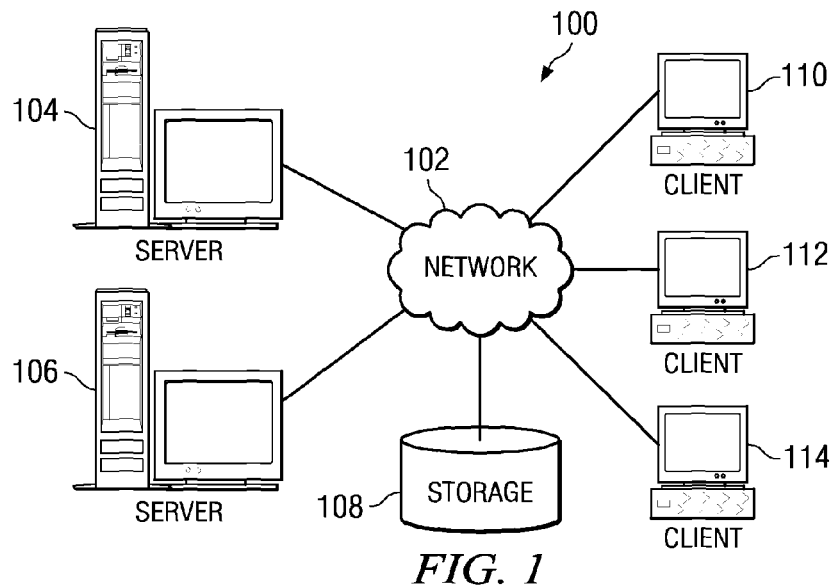
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note, that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
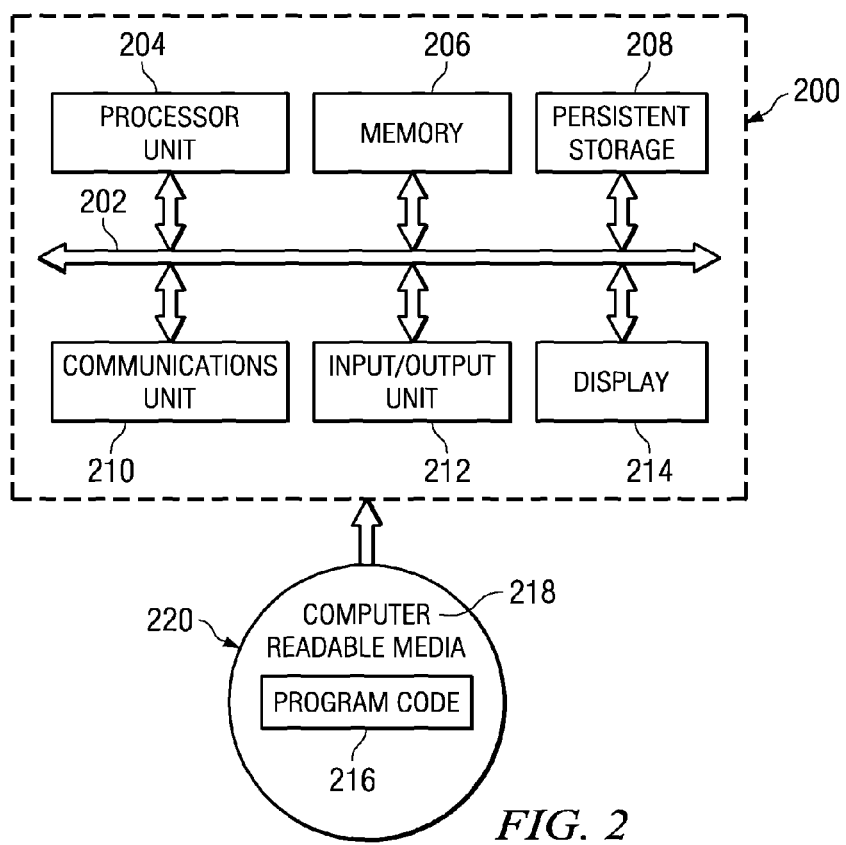
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code. As one example, the data processing system may include organic components integrated with organic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
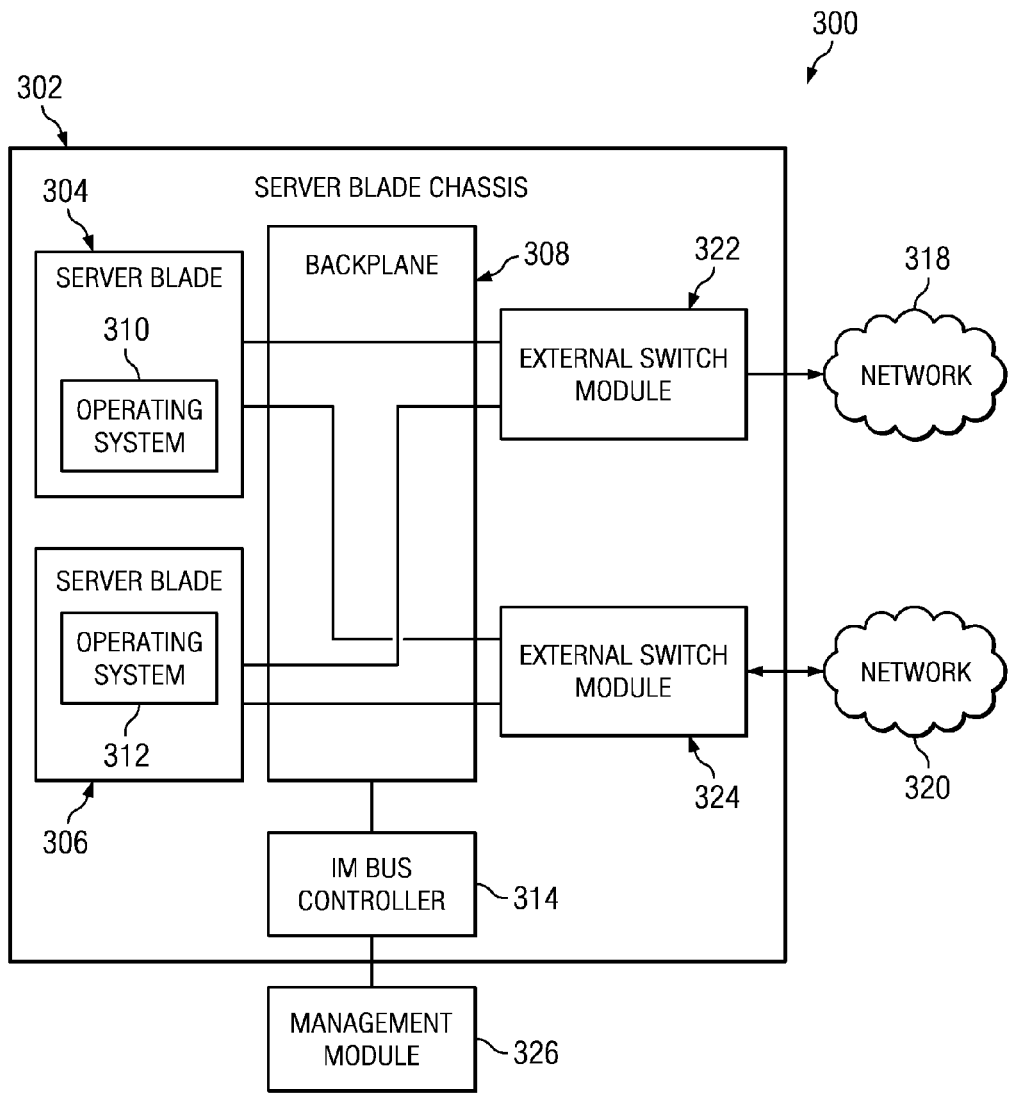
FIG. 3 is a typical server blade architecture according to the prior art.

Referring now to FIG. 3, a typical server blade architecture is shown according to the prior art. Blade server chassis architecture 300 contains several server blades 304 and 306 which can be servers 104 or 106 of FIG. 1.

Server blade chassis 302 includes multiple hot-swappable server blades 304 and 306, which are connected to backplane 308. Server blades 304 and 306 include operating systems 310 and 312 which communicate through backplane 308 via an intermediate bus controller 314. Intermediate bus controller 314 is a processor or integrated circuit that directs communication to and from operating systems 310 and 312 through backplane 308. Operating systems 310 and 312 may be implemented with any of a variety of commercially distributed general purpose microprocessors including PowerPC® processors available from IBM Corporation.

Server blades 304 and 306 can connect to outside networks 318 and 320 through external switch modules 322 and 324. External switch modules 322 and 324 are hot-swappable switches that connect all blade servers in server blade chassis 302 to one of outside networks 318 or 320, depending on the bay in which external switch modules 322 or 324 is installed in.

Server blade chassis 302 includes management module 326. Management module 326 is a hot-swappable hardware device plugged into server blade chassis 302. Management module 326 functions as a system-management service processor and keyboard, video, and mouse multiplexor for the blade servers.

The illustrative embodiments provided herein describe a method for propagating link status information received by a blade server to the various ports of an embedded multi-port switch. The link status of a switch port in an external switch module can be communicated to the operating systems of individual blade servers that are affected by that link status. When an external switch module is unplugged from server blade chassis, the bus controller broadcasts a link down event, such as a link down interrupt, to the individual server blades where it is received by the embedded multi-port switch for those server blades. The embedded multi-port switch translates the link down interrupt into a hardware link down event, and forwards the hardware link down event to the other elements connected to the embedded multi-port switch, such as, for example, the operating system on the blade server and the service firmware on the blade server.

Figure 4:
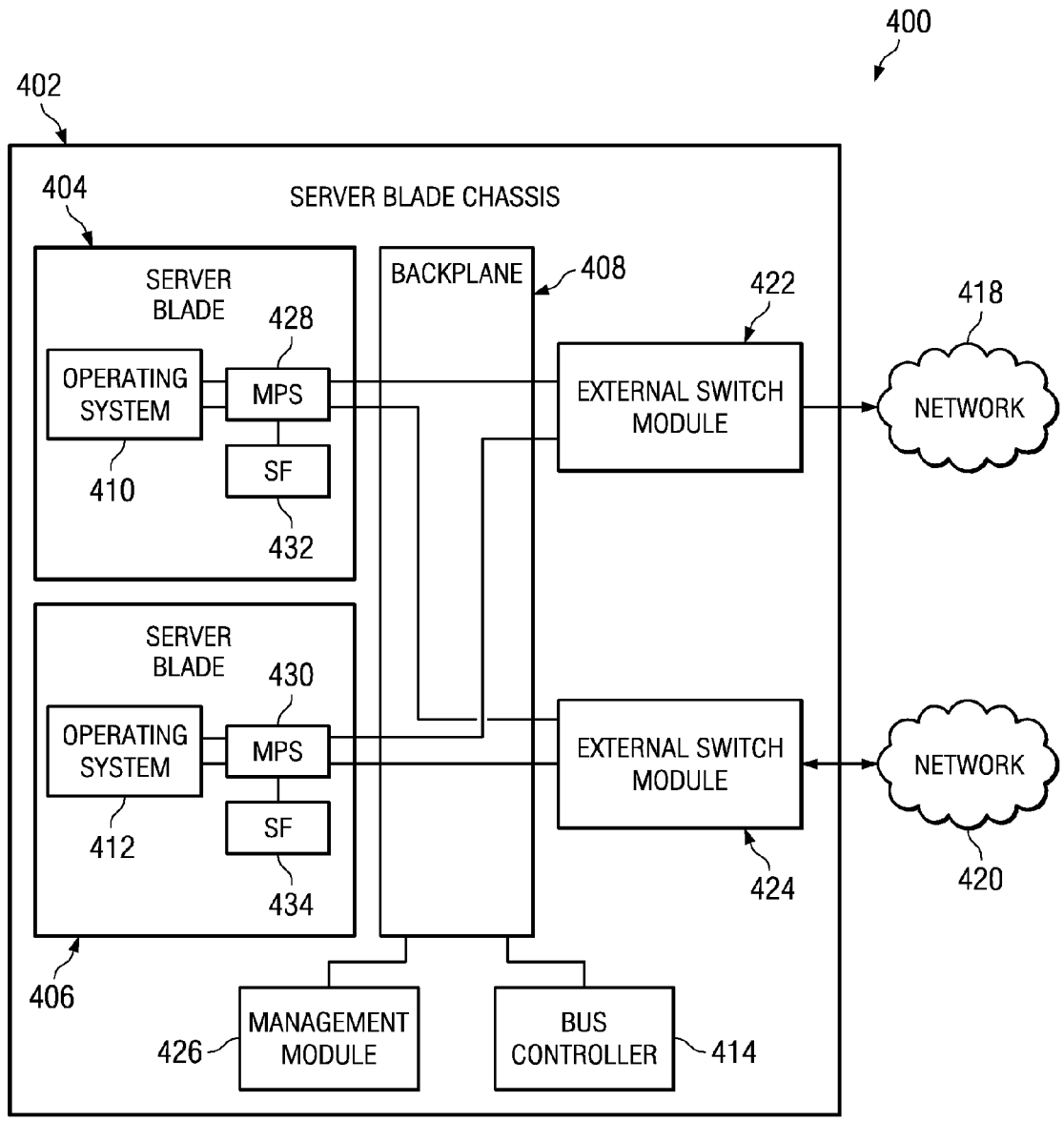
FIG. 4 is a blade server architecture according to an illustrative embodiment.

Referring now to FIG. 4, blade server architecture is shown according to an illustrative embodiment. Blade server architecture 400 contains several server blades 404 and 406 which can be servers 104 or 106 of FIG. 1.

Server blade chassis 402 includes multiple hot-swappable server blades 404 and 406, which are connected to backplane 408. Server blades 404 and 406 include operating systems 410 and 412 which communicate through backplane 408 via an intermediate bus controller 414. Intermediate bus controller 414 is a processor or integrated circuit that directs communication to and from operating systems 410 and 412 through backplane 408. Operating systems 410 and 412 may be implemented with any of a variety of commercially distributed general purpose microprocessors including PowerPC® processors available from International Business Machines Corporation.

Server blades 404 and 406 can connect to outside networks 418 and 420 through external switch modules 422 and 424. External switch modules 422 and 424 are hot-swappable switches that connect all blade servers in server blade chassis 402 to one of outside networks 418 or 420, depending on the bay in which external switch modules 422 or 424 is installed in.

Server blade chassis 402 includes management module 426. Management module 426 is a hot-swappable hardware device plugged into server blade chassis 402. Management module 426 functions as a system-management service processor and keyboard, video, and mouse multiplexor for the blade servers.

Server blades 404 and 406 include embedded multi-port switches 428 and 430. Multi-port switches 428 and 430 are switches that provide external connectivity to other units within server blades 404 and 406, such as for example, service firmware 432 and 434, and operating systems 410 and 412.

Service firmware 432 and 434 are firmware components, embedded onto server blades 404 and 406, or a software component stored within a local memory of server blades 404 and 406. Service firmware 432 and 434 is firmware that provides diagnostics, initialization, configuration, run-time error detection and correction. FSP is what connects the managed system to the Hardware Management Console (HMC). Service firmware 432 and 434 can be the flexible service processor associated with IBM eServers and other IBM systems. Service firmware 432 and 434 provides diagnostics, initialization, configuration, run-time error detection, and correction for server blades 404 and 406.

Figure 5:
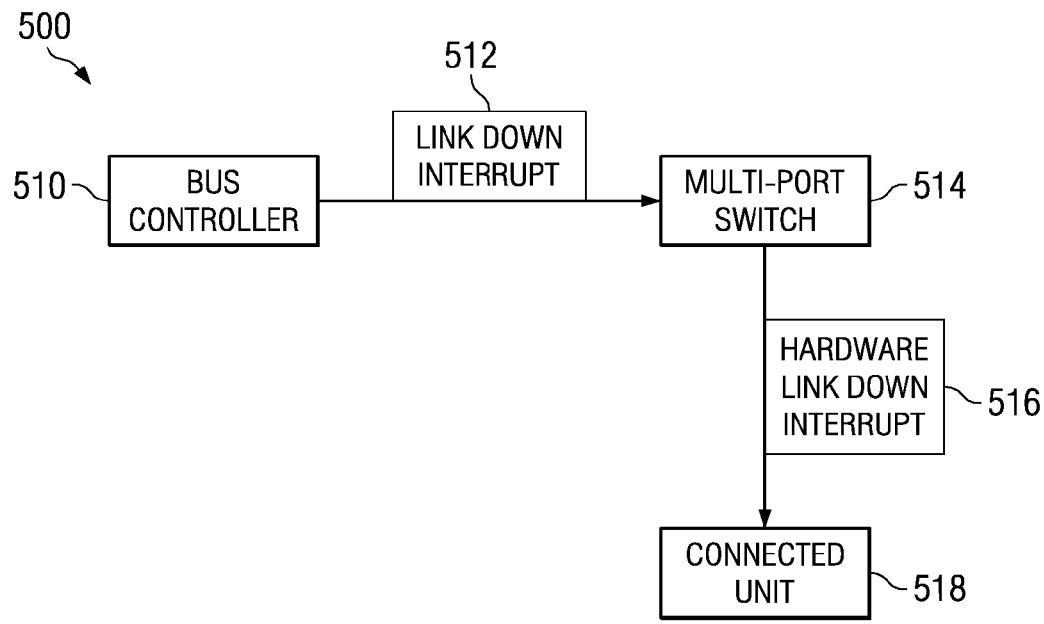
FIG. 5 is a data flow diagram for propagating link status information according to an illustrative embodiment.

Referring now to FIG. 5, a data flow diagram for intelligently propagating link status information is shown according to an illustrative embodiment. The data flow of FIG. 5 is implemented in blade server architecture 400 of FIG. 4.

Intermediate bus controller 510 is intermediate bus controller 414 of FIG. 4. Intermediate bus controller 510 detects that an external switch module, such as external switch modules 422 and 424 of FIG. 4 is disconnected from the blade server chassis. The disconnect of the external switch module from the blade server chassis results in a communications loss between the server blade and the outside network. In response to this loss of communication, intermediate bus controller 510 generates link down interrupt 512. Link down interrupt 512 is an asynchronous signal from intermediate bus controller 510 indicating the communications loss between the server blade and the outside network. Link down interrupt 512 is broadcast from intermediate bus controller 510 to each server blade, such as Server blades 404 and 406 of FIG. 4, within the server blade chassis, such as Server blade chassis 402 of FIG. 4. Link down interrupt 512 is received at the server blade by multi-port switch 514, which can be one of multi-port switches 428 and 430 of FIG. 4.

Responsive to receiving link down interrupt 512, multi-port switch 514 generates hardware link down interrupt 516. Hardware link down interrupt 516 is an asynchronous signal from multi-port switch 514. Hardware link down interrupt 516 is sent from multi-port switch 514 to connected unit 518. Connected unit 518 is a unit within the server blade that is connected to a port of multi-port switch 514. Connected unit 518 can be, for example, service firmware 432 and 434 of FIG. 4, and operating systems operating systems 410 and 412 of FIG. 4.

Figure 6:
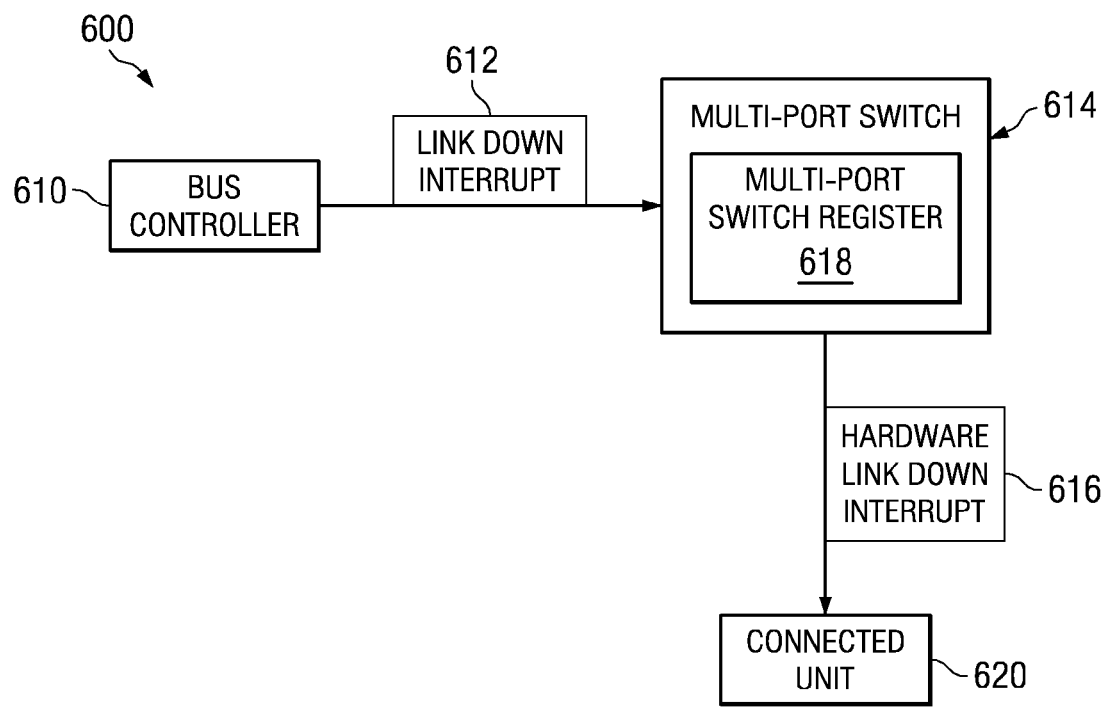
FIG. 6 is a data flow diagram for propagating link status information according to multi-port switch register according to an illustrative embodiment.

Referring now to FIG. 6, a data flow diagram for propagating link status information according to multi-port switch register is shown according to an illustrative embodiment. The data flow of FIG. 6 is implemented in blade server architecture 400 of FIG. 4.

Intermediate bus controller 610 is intermediate bus controller 414 of FIG. 4. Intermediate bus controller 610 detects that an external switch module, such as external switch modules 422 and 424 of FIG. 4 is disconnected from the blade server chassis. Disconnecting the external switch module from the blade server chassis results in a communications loss between the server blade and the outside network. In response to this loss of communication, intermediate bus controller 610 generates link down interrupt 612. Link down interrupt 612 is an asynchronous signal from intermediate bus controller 610 indicating the communications loss between the server blade and the outside network. Link down interrupt 612 is broadcast from intermediate bus controller 610 to each server blade, such as Server blades 404 and 406 of FIG. 4, within the server blade chassis, such as server blade chassis 402 of FIG. 4. Link down interrupt 612 is received at the server blade by multi-port switch 614, which can be one of multi-port switches 428 and 430 of FIG. 4.

Responsive to receiving link down interrupt 612, multi-port switch 614 identifies which ports of multi-port switch 614 to send hardware link down interrupt 616. Multi-port switch 614 can identify which ports of multi-port switch 614 to send hardware link down interrupt 616 by examining multi-port switch register 618. Multi-port switch register 618 is a hardware register that stores information defining the conditions under which connected unit 620 should be notified of the hardware link down interrupt 616.

In one illustrative embodiment, connected unit 620 is a service firmware, such as service firmware 432 and 434 of FIG. 4. Connected unit 620 may direct multi-port switch register 618 to inform connected unit 620 of every link down interrupt 612 that is received by multi-port switch 614. In this illustrative embodiment, multi-port switch 614 generates hardware link down interrupt 616, and directs hardware link down interrupt 616 to the port connecting multi-port switch 614 to connected unit 620.

In another illustrative embodiment, connected unit 620 is an operating system, such as operating systems 410 and 412 of FIG. 4. Connected unit 620 may direct multi-port switch register 618 to inform connected unit 620 of link down interrupt 612 only when link down interrupt 612 is not followed by a link up event within a certain period of time. That is, connected unit 620 is informed only of those link-down events that are not link fluctuations. In this illustrative embodiment, multi-port switch 614 generates hardware link down interrupt 616, and forwards hardware link down interrupt 616 to the port connecting multi-port switch 614 to connected unit 620.

Figure 7:
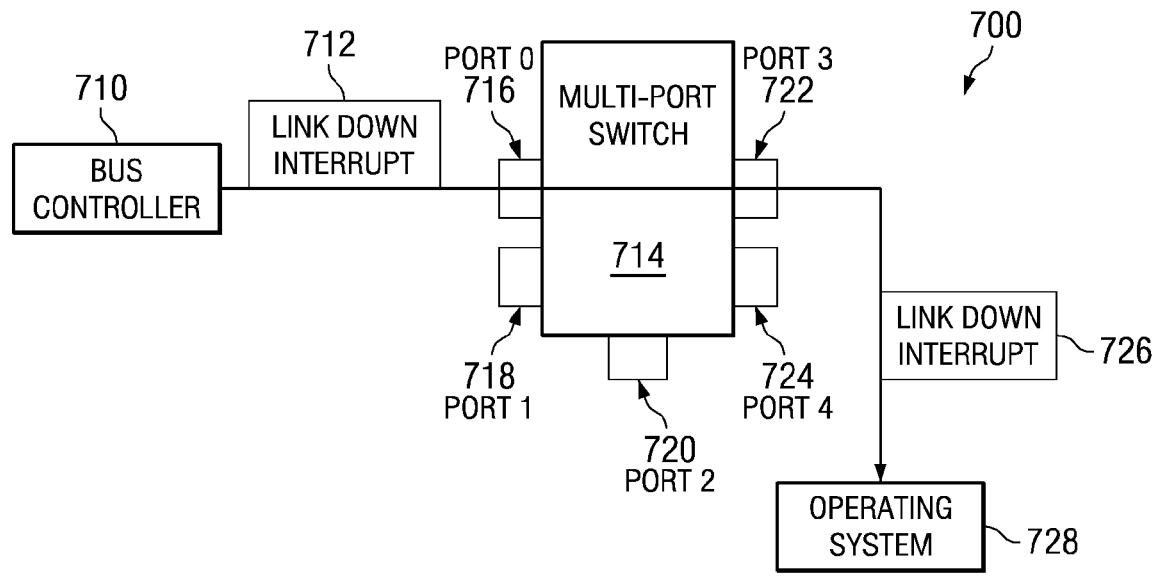
FIG. 7 is a data flow diagram for intelligently propagating link status information according to port-forwarding according to an illustrative embodiment.

Referring now to FIG. 7, a data flow diagram for intelligently propagating link status information according to port-forwarding is shown according to an illustrative embodiment. The data flow of FIG. 7 is implemented in blade server architecture 400 of FIG. 4.

Intermediate bus controller 710 is intermediate bus controller 414 of FIG. 4. Intermediate bus controller 710 detects that an external switch module, such as external switch modules 422 and 424 of FIG. 4 is disconnected from the blade server chassis. Disconnecting the external switch module from the blade server chassis results in a communications loss between the server blade and the outside network. In response to this loss of communication, intermediate bus controller 710 generates link down interrupt 712. Link down interrupt 712 is an asynchronous signal from intermediate bus controller 710 indicating the communications loss between the server blade and the outside network. Link down interrupt 712 is broadcast from intermediate bus controller 710 to each server blade, such as server blades 404 and 406 of FIG. 4, within the server blade chassis, such as server blade chassis 402 of FIG. 4. Link down interrupt 712 is received at the server blade by multi-port switch 714, which can be one of multi-port switches 428 and 430 of FIG. 4.

Multi-port switch 714 is configured such that port 0 716 and port 1 718 are connected to external switch modules, such as external switch modules 422 and 424 of FIG. 4. Port 2 720 is connected to a service firmware, such as service firmware 432 and 434 of FIG. 4. Port 3 722 and port 4 724 are connected to operating system 728 of the blade server, which can be operating systems 410 and 412 of FIG. 4. Multi-port switch 714 is configured such that packets received at port 0 716 are forwarded to port 3 722 via a port-forwarding mechanism. Packets received at port 1 718 are forwarded to port 4 724 via a port-forwarding mechanism.

Link down interrupt 726 is received at port 0 716. Responsive to receiving link down interrupt 726, the multi-port switch forwards link down interrupt 726 directly to port 3 722 via a port-forwarding mechanism for receipt by the operating system. The link down interrupt 726 is forwarded to operating system 728 through port 3 722 without need to relay link down interrupt 726 to port 4 724. Communication was interrupted between the external switch module that is connected to port 0 716. However, communication between the external switch module that is connected to port 1 718 remains usable. Therefore, there is no need to relay link down interrupt 726 received at port 0 716 on to port 1 718.

Figure 8:
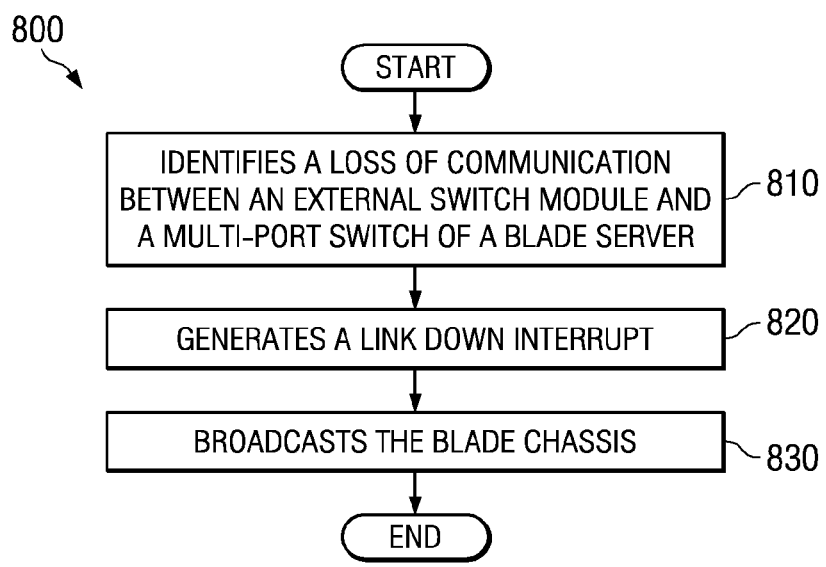
FIG. 8 is a flowchart for generating link status information according to an illustrative embodiment.

Referring now to FIG. 8, a flowchart for generating link status information is shown according to an illustrative embodiment. Process 800 is a firmware process, executing on a firmware component, such as bus controller 414 of FIG. 4.

Process 800 begins by identifying a loss of communication between an external switch module and a multi-port switch of a blade server (step 810). The external switch module can be one of external switch modules 422 and 424 of FIG. 4. The multi-port switch can be one of multi-port switches 428 and 430 of FIG. 4. The disconnect of the external switch module from the blade server chassis results in a communications loss between the server blade and the outside network.

Responsive to identifying a loss of communication between an external switch module and a multi-port switch of a blade server, process 800 generates a link down interrupt (step 820). The link down interrupt is an asynchronous signal from an intermediate bus controller indicating the communications loss between the server blade and the outside network. The link down interrupt can be link down interrupt 512 of FIG. 5. Responsive to generating the link down interrupt, process 800 broadcasts the link down interrupt from the intermediate bus controller to each server blade in the server blade chassis (step 830), with the process terminating thereafter.

Figure 9:
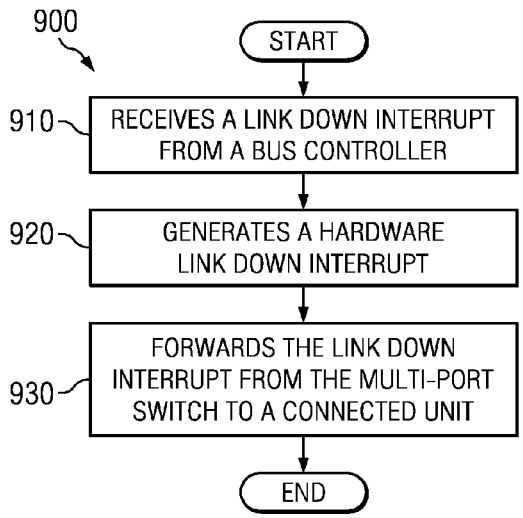
FIG. 9 is a flowchart for intelligently propagating link status information according to an illustrative embodiment.

Referring now to FIG. 9, a flowchart for intelligently propagating link status information is shown according to an illustrative embodiment. Process 900 is a firmware process, executing on a firmware component, such multi-port switches 428 and 430 of FIG. 4.

Process 900 begins by receiving a link down interrupt from a bus controller (step 910). The bus controller can be bus controller 414 of FIG. 4. The link down interrupt can be link down interrupt 512 of FIG. 5.

Responsive to receiving a link down interrupt from a bus controller, process 900 generates a hardware link down interrupt (step 920). The hardware link down can even be hardware link down interrupt 516 of FIG. 5.

Responsive to generating the hardware link down interrupt, process 900 forwards the hardware link down interrupt from multi-port switch to a connected unit (step 930), with the process terminating thereafter. The hardware link down interrupt is forwarded from multi-port switch to a connected unit such as connected unit 518 of FIG. 5. The connected unit is a unit within the server blade that is connected to a port of a multi-port switch. The connected unit can be, for example, service firmware 432 and 434 of FIG. 4, and operating systems operating systems 410 and 412 of FIG. 4.

Figure 10:
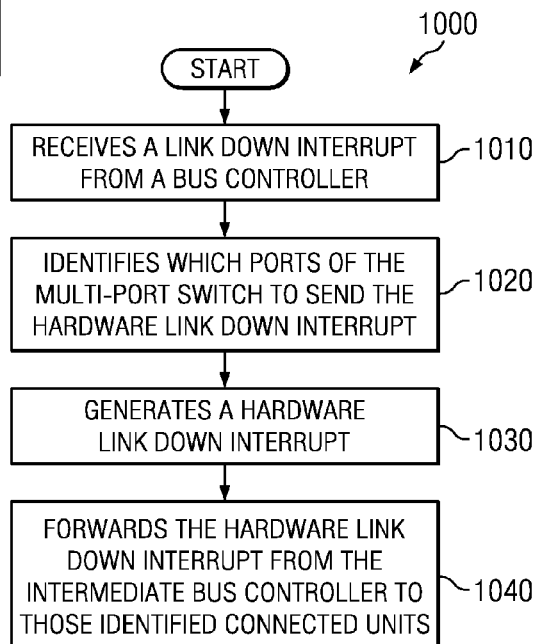
FIG. 10 is a flowchart for intelligently propagating link status information according to multi-port switch register according to an illustrative embodiment.

Referring now to FIG. 10, a flowchart for intelligently propagating link status information according to multi-port switch register is shown according to an illustrative embodiment. Process 1000 is a firmware process, executing on a firmware component, such multi-port switches 428 and 430 of FIG. 4.

Process 1000 begins by receiving a link down interrupt from a bus controller (step 1010). The bus controller can be bus controller 414 of FIG. 4. The link down interrupt can be link down interrupt 612 of FIG. 6.

Responsive to receiving the link down interrupt, process 1000 identifies which ports of the multi-port switch to send the hardware link down interrupt (step 1020). In one illustrative embodiment, process 1000 identifies which ports of the multi-port switch to send the hardware link down interrupt to by examining a multi-port switch register. The multi-port switch register is a hardware register that stores information defining the conditions under which a connected unit should be notified of the hardware link down interrupt. The multi-port switch register can be multi-port switch register 618 of FIG. 6.

Responsive to identifying which ports of the multi-port switch to send the hardware link down interrupt, process 1000 generates a hardware link down interrupt (step 1030). The hardware link down interrupt can be hardware link down interrupt 516 of FIG. 5. Responsive to generating the link down interrupt, process 1000 forwards the hardware link down interrupt from the intermediate bus controller to those identified connected units (step 1040), with the process terminating thereafter. By forwarding the hardware link down interrupt only to those connected units that were identified in examining the multi-port switch register, connected units uninterested in the hardware link down interrupt are not forced to process the interrupt.

Figure 11:
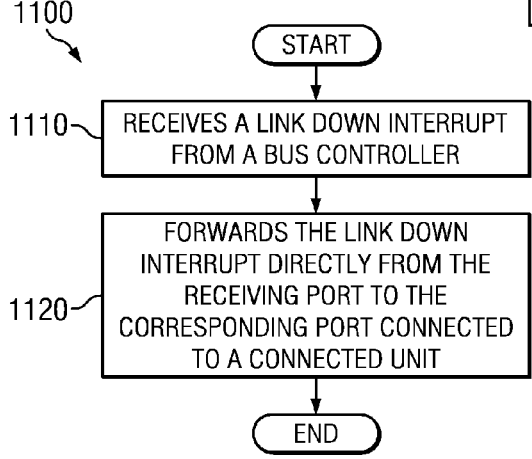
FIG. 11 is a flowchart for intelligently propagating link status information according to port-forwarding according to an illustrative embodiment.

Referring now to FIG. 11, a flowchart for intelligently propagating link status information according to port-forwarding is shown according to an illustrative embodiment. Process 1100 is a firmware process, executing on a firmware component, such multi-port switches 428 and 430 of FIG. 4.

Process 1100 begins by receiving a link down interrupt from a bus controller (step 1110). The bus controller can be bus controller 414 of FIG. 4. The link down interrupt can be link down interrupt 712 of FIG. 7.

The multi-port switch on which process 1100 executes is configured such that a first port, such as port 0 716 of FIG. 7, that is connected to an external switch module forwards packets directly to a second port, such as port 3 722 of FIG. 7, that is connected to a connected unit. A third port, such as port 1 718 of FIG. 7, is connected to a separate external switch module, forwards packets directly to a fourth port, such as port 4 724 of FIG. 7, that is also connected to a connected unit.

Responsive to receiving a receiving a link down interrupt from a bus controller, process 1100 forwards the link down interrupt directly from the receiving port to the corresponding port connected to a connected unit (step 1120), with the process terminating thereafter. The link down interrupt is forwarded without need to relay the link down interrupt to other ports of the multi-port switch.

Thus, the illustrative embodiments provided herein describe a method for intelligently propagating link status information received by a blade server to the various ports of an embedded multi-port switch. The link status of a switch port in an external switch module can be communicated to the operating systems of individual blade servers that are affected by that link status. When an external switch module is unplugged from a server blade chassis, the bus controller broadcasts a link down event, such as a link down interrupt, to the individual server blades where it is received by the embedded multi-port switch for those server blades. The embedded multi-port switch translates the link down interrupt into a hardware link down event, and forwards the hardware link down event to the other elements connected to the embedded multi-port switch, such as for example, the operating system on the blade server and the service firmware on the blade server.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for propagating link status information in a blade server, the method comprising the computer implemented steps of:
    identifying a communication loss between an external switch module and a multi-port switch of a blade server, wherein the communication loss is identified by an intermediate bus controller;
    responsive to identifying the communication loss between the external switch module and the multi-port switch of the blade server, generating a link down interrupt wherein the link down interrupt is generated by the intermediate bus controller;
    responsive to generating the link down interrupt, broadcasting the link down interrupt from the intermediate bus controller to a server blade of the blade server;
    receiving the link down interrupt from the intermediate bus controller at a multi-port switch of the server blade;
    responsive to receiving the link down interrupt from the intermediate bus controller, generating a hardware link down interrupt, wherein the hardware link down interrupt is generated by the multi-port switch; and
    responsive to generating the hardware link down interrupt, forwarding the hardware link down interrupt from the multi-port switch to a connected unit.

2. The computer implemented method of claim 1, wherein the connected unit is selected from the group consisting of a service firmware and a server blade operating system.

3. The computer implemented method of claim 1, further comprising the computer implemented steps of:
    identifying at least one port of the multi-port switch the hardware link down interrupt is to be sent to, wherein the at least one port is identified from a multi-port switch register; and
    wherein the step of forwarding the hardware link down interrupt from the multi-port switch to a connected unit further comprises:
    responsive to generating the hardware link down interrupt, forwarding the hardware link down interrupt from the multi-port switch to a connected unit, wherein the connected unit is connected to the at least one port.

4. The computer implemented method of claim 3 wherein the multi-port switch register is a hardware register that stores at least one condition under which the hardware link down interrupt should be forwarded to the connected unit, wherein the at least one condition comprises:
    forwarding the hardware link down interrupt to the connected unit for every link down interrupt that is received by multi-port switch; or
    forwarding the hardware link down interrupt to the connected unit only if the link down interrupt is not followed by a link up event within a certain period of time.

5. The computer implemented method of claim 1, wherein the communication loss is a disconnect of the external switch module from an outside network.

6. The computer implemented method of claim 5, wherein the external switch is a hot-swappable switch that connects a server blade of the blade server to the outside network.

7. A tangible computer readable medium having a computer program product encoded thereon for intelligently propagating link status information in a blade server, the computer readable medium comprising:
    computer usable instructions for identifying a communication loss between an external switch module and a multi-port switch of a blade server, wherein the communication loss is identified by an intermediate bus controller;
    computer usable instructions, responsive to identifying the communication loss between the external switch module and the multi-port switch of the blade server, generating a link down interrupt wherein the link down interrupt is generated by the intermediate bus controller; and
    computer usable instructions, responsive to generating the link down interrupt, for broadcasting the link down interrupt from the intermediate bus controller to a server blade of the blade server;
    computer usable instructions for receiving the link down interrupt from the intermediate bus controller bus controller at a multi-port switch of the server blade;
    computer usable instructions, responsive to receiving the link down interrupt from the intermediate bus controller, generating a hardware link down interrupt, wherein the hardware link down interrupt is generated by the multi-port switch; and
    computer usable instructions, responsive to generating the hardware link down interrupt, for forwarding the hardware link down interrupt from the multi-port switch to a connected unit.

8. The tangible computer readable medium of claim 7, wherein the connected unit is selected from the group consisting of a service firmware and a server blade operating system.

9. The tangible computer readable medium of claim 7, wherein the computer readable medium further comprises:

computer usable instructions for identifying at least one port of the multi-port switch the hardware link down interrupt is to be sent to, wherein the at least one port is identified from a multi-port switch register; and wherein the computer usable instructions for forwarding the hardware link down interrupt from the multi-port switch to a connected unit further comprises:

computer usable instructions, responsive to generating the hardware link down interrupt, for forwarding the hardware link down interrupt from the multi-port switch to a connected unit, wherein the connected unit is connected to the at least one port.

10. The tangible computer readable medium of claim 9, wherein the multi-port switch register is a hardware register that stores at least one condition under which the hardware link down interrupt should be forwarded to the connected unit, wherein the at least one condition comprises:

forwarding the hardware link down interrupt to the connected unit for every link down interrupt that is received by multi-port switch; or forwarding the hardware link down interrupt to the connected unit only if the link down interrupt is not followed by a link up event within a certain period of time.

11. The tangible computer readable medium of claim 7, wherein the communication loss is a disconnect of the external switch module from an outside network.

12. The tangible computer readable medium of claim 11, wherein the external switch is a hot-swappable switch that connects a server blade of the blade server to the outside network.

13. A data processing system comprising:

a bus;

a communications unit connected to the bus;

a memory connected to the bus, wherein the memory includes a computer usable code for propagating link status information in a blade server; and a processor unit connected to the bus, wherein the processor unit executes the computer usable code to identify a communication loss between an external switch module and a multi-port switch of a blade server, wherein the communication loss is identified by an intermediate bus controller; responsive to identifying the communication loss between the external switch module and the multi-port switch of the blade server, to generate a link down interrupt wherein the link down interrupt is generated by the intermediate bus controller; responsive to generating the link down interrupt, to broadcast the link down interrupt from the intermediate bus controller to a server blade of the blade server; to receive the link down interrupt from the intermediate bus controller bus controller at a multi-port switch of the server blade; responsive to receiving the link down interrupt from the intermediate bus controller, to generate a hardware link down interrupt, wherein the hardware link down interrupt is generated by the multi-port switch; and responsive to generating the hardware link down interrupt, to forward the hardware link down interrupt from the multi-port switch to a connected unit.

14. The data processing system of claim 13, wherein the connected unit is selected from the group consisting of a service firmware and a server blade operating system.

15. The data processing system of claim 13, wherein the processor unit further executes the computer usable code to identify at least one port of the multi-port switch the hardware link down interrupt is to be sent to, wherein the at least one port is identified from a multi-port switch register; and wherein the processor unit executing the computer usable code to of forwarding the hardware link down interrupt from the multi-port switch to a connected unit further comprises the processor unit executing the computer usable code responsive to generating the hardware link down interrupt, to forward the hardware link down interrupt from the multi-port switch to a connected unit, wherein the connected unit is connected to the at least one port.

16. The data processing system of claim 15 wherein the multi-port switch register is a hardware register that stores at least one condition under which the hardware link down interrupt should be forwarded to the connected unit, wherein the at least one condition comprises:

forwarding the hardware link down interrupt to the connected unit for every link down interrupt that is received by multi-port switch; or forwarding the hardware link down interrupt to the connected unit only if the link down interrupt is not followed by a link up event within a certain period of time.

17. The data processing system of claim 13, wherein the communication loss is a disconnect of the external switch module from an outside network, and wherein the external switch is a hot-swappable switch that connects a server blade of the blade server to the outside network.

18. A computer implemented method for propagating link status information in a blade server, the method comprising the computer implemented steps of:

identifying a communication loss between an external switch module and a multi-port switch of a blade server, wherein the communication loss is identified by an intermediate bus controller, and wherein the communication loss is a disconnect of the external switch module from an outside network, wherein the external switch is a hot-swappable switch that connects a server blade of the blade server to the outside network;

responsive to identifying the communication loss between the external switch module and the multi-port switch of the blade server, generating a link down interrupt wherein the link down interrupt is generated by the intermediate bus controller; and responsive to generating the link down interrupt, broadcasting the link down interrupt from the intermediate bus controller to the server blade of the blade server;

receiving the link down interrupt from the intermediate bus controller at a multi-port switch of the server blade;

responsive to receiving the link down interrupt from the intermediate bus controller, generating a hardware link down interrupt, wherein the hardware link down interrupt is generated by the multi-port switch;

identifying at least one port of the multi-port switch the hardware link down interrupt is to be sent to, wherein the at least one port is identified from a multi-port switch register, wherein the multi-port switch register is a hardware register that stores at least one condition under which the hardware link down interrupt should be forwarded to the connected unit;

responsive to generating the hardware link down interrupt, forwarding the hardware link down interrupt from the multi-port switch to a connected unit, wherein the connected unit is selected from the group consisting of a service firmware and a server blade operating system, wherein the connected unit is connected to the at least one port, wherein the hardware link down interrupt is forwarded for every link down interrupt that is received by multi-port switch or wherein the hardware link down interrupt is forwarded only if the link down interrupt is not followed by a link up event within a certain period of time.

19. An apparatus comprising:
a chassis;
a number of server blades located within the chassis;
an intermediate bus controller, wherein the intermediate bus controller is capable of identifying a communication loss between an external switch module and a multi-port switch of a blade server; generating a link down interrupt wherein the link down interrupt is generated by the intermediate bus controller; and responsive to generating the link down interrupt, broadcasting the link down interrupt from the intermediate bus controller to the number of server blades; and
a multi-port switch, wherein the multi-port switch is capable of receiving the link down interrupt from the intermediate bus controller at a multi-port switch of the server blade;
responsive to receiving the link down interrupt from the intermediate bus controller, generating a hardware link down interrupt, wherein the hardware link down interrupt is generated by the multi-port switch; and responsive to generating the hardware link down interrupt, forwarding the hardware link down interrupt from the multi-port switch to a connected unit.

20. The apparatus of claim 19, wherein the connected unit is selected from the group consisting of a service firmware and a server blade operating system.

21. The apparatus of claim 19, further comprising:
a multi-port switch register,
wherein the multi-port switch is further capable of identifying at least one port of the multi-port switch from the multi-port switch register to which the hardware link down interrupt is to be sent; and responsive to generating the hardware link down interrupt, forwarding the hardware link down interrupt from the multi-port switch to a connected unit, wherein the connected unit is connected to the at least one port.

* * * * *